(12) United States Patent
Fujiwara et al.

(10) Patent No.: US 12,613,652 B2
(45) Date of Patent: Apr. 28, 2026

(54) CONTROL CIRCUIT, INFORMATION PROCESSING SYSTEM, AND CONTROL METHOD

(71) Applicant: CANON KABUSHIKI KAISHA, Tokyo (JP)

(72) Inventors: Makoto Fujiwara, Tokyo (JP); Daisuke Shiraishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/717,694

(22) Filed: Apr. 11, 2022

(65) Prior Publication Data

US 2022/0334758 A1 Oct. 20, 2022

(30) Foreign Application Priority Data

Apr. 14, 2021 (JP) ................................. 2021-068304

(51) Int. Cl.
G06F 3/06 (2006.01)

(52) U.S. Cl.
CPC .......... G06F 3/0655 (2013.01); G06F 3/0604 (2013.01); G06F 3/0673 (2013.01)

(58) Field of Classification Search
CPC ...... G06F 13/18; G06F 13/372; G06F 13/225;

G06F 3/0611; G06F 3/0655; G06F 3/0604; G06F 3/0673; H04N 1/0092; H04N 1/00923; H04N 1/00917

See application file for complete search history.

(56) References Cited

U.S. PATENT DOCUMENTS

2016/0127592 A1* 5/2016 Nakamura ........... H04N 1/0092
358/1.13

FOREIGN PATENT DOCUMENTS

| JP | 2007094649 A | 4/2007 |
| JP | 2008172353 A | 7/2008 |

* cited by examiner

*Primary Examiner* — Ernest Unelus

(74) *Attorney, Agent, or Firm* — Canon U.S.A., Inc. IP Division

(57) ABSTRACT

In a control circuit, a request storage unit including a plurality of entries for storing an access request, to which a priority and attribute information are applied, stores the received access request, a priority update unit updates the priority of the access request based on the priority and the attribute information of the access request stored in the request storage unit, and a request selection unit selects and transmits the access request stored in the request storage unit based on the updated priority.

15 Claims, 4 Drawing Sheets

FIG.3A

| | ENTRY NUMBER | ACCESS REQUEST | PRIORITY | ATTRIBUTE INFORMATION | |
|---|---|---|---|---|---|
| | | | | ID | READ/WRITE |
| LAST | 6 | | | | |
| | 5 | E | 5 | 1 | READ |
| | 4 | D | 4 | 2 | WRITE |
| | 3 | C | 1 | 1 | READ |
| | 2 | B | 1 | 1 | WRITE |
| TOP | 1 | A | 1 | 0 | READ |

FIG.3B

| | ACCESS REQUEST | PRIORITY | ATTRIBUTE INFORMATION | |
|---|---|---|---|---|
| | | | ID | READ/WRITE |
| LATER | E | 5 | 1 | READ |
| | C | 1 | 1 | READ |
| ISSUANCE ORDER | B | 1 | 1 | WRITE |
| | A | 1 | 0 | READ |
| EARLIER | D | 4 | 2 | WRITE |

FIG.3C

| | ACCESS REQUEST | PRIORITY | ATTRIBUTE INFORMATION | |
|---|---|---|---|---|
| | | | ID | READ/WRITE |
| LATER | B | 1 | 1 | WRITE |
| | A | 1 | 0 | READ |
| ISSUANCE ORDER | D | 4 | 2 | WRITE |
| | E | 5 | 1 | READ |
| EARLIER | C | 1→5 | 1 | READ |

FIG.4

CONTROL CIRCUIT, INFORMATION PROCESSING SYSTEM, AND CONTROL METHOD

BACKGROUND

Field

The present disclosure relates to a control circuit that performs control related to an access request, an information processing system, and a control method.

Description of the Related Art

There are computer systems in which a plurality of initiators such as processing units share a target such as a single or a plurality of memories. Such a computer system may be provided with a control circuit that controls access requests from the plurality of initiators by selecting a plurality of access requests and the like. As performance requirements for an access of each initiator increases as technology improves, it has become important for such control circuits to be able to control a selection order of access requests in order to satisfy performance requirements of the access requests. At the same time, if only high-priority access requests with demanding performance requirements are selected, low-priority access requests may be kept waiting endlessly. A technique for avoiding this result is discussed, for example, in Japanese Patent Application Laid-Open No. 2007-94649.

According to the technique discussed in Japanese Patent Application Laid-Open No. 2007-94649, a control circuit that applies a priority to an access request and selects a first access request based on the first access request having a higher priority, adds a priority to a second access request that was not selected due to the first access request (having the higher priority) being selected. The control circuit increases the priority of the second (overtaken) access request, as described above, to prevent a circumstance in which the lower-priority second access request is kept waiting endlessly.

In addition, there are computer systems in which attribute information from which a request source and a priority can be determined, can be applied to an access request. In such computer systems, a target applies attribute information, which has been applied to an access request, to a response to the access request, and by this mechanism an initiator can determine which access request the response corresponds to.

Accordingly, if a plurality of access requests including the same attribute information is issued, the initiator cannot determine from the attribute information which access request the response corresponds to, so that a selection order of access requests is restricted. In this case, it is necessary for a control circuit to select the access requests including the same attribute information in an order of reception. In such a computer system, in a case where a high-priority access request having attribute information is issued after a low-priority access request having the same attribute information, the high-priority access request cannot be selected before a preceding low-priority access request and will be kept waiting.

SUMMARY

Various embodiments of the present disclosure provide techniques and mechanisms for promptly selecting a high-priority access request even if there is a preceding low-priority access request including the same attribute information.

According to an aspect of the present disclosure, a control circuit includes a storage unit configured to include a plurality of entries for storing an access request that a priority and attribute information are applied to and to store the access request that is received, an update unit configured to update the priority of the access request based on the priority and the attribute information of the access request stored in the storage unit, and a selection unit configured to select and transmit the access request stored in the storage unit based on the priority updated by the update unit.

Further features of the present disclosure will become apparent from the following description of example embodiments with reference to the attached drawings.

BRIEF DESCRIPTION OF THE DRAWINGS

FIGS. 3A, 3B and 3C illustrate examples of operations by the control circuit according to the present example embodiment.

FIG. 4 illustrates an example of an information processing system to which the control circuit according to the present example embodiment is applied.

DESCRIPTION OF THE EMBODIMENTS

Example embodiments of the present disclosure will be described below with reference to the attached drawings.

Figure 1:
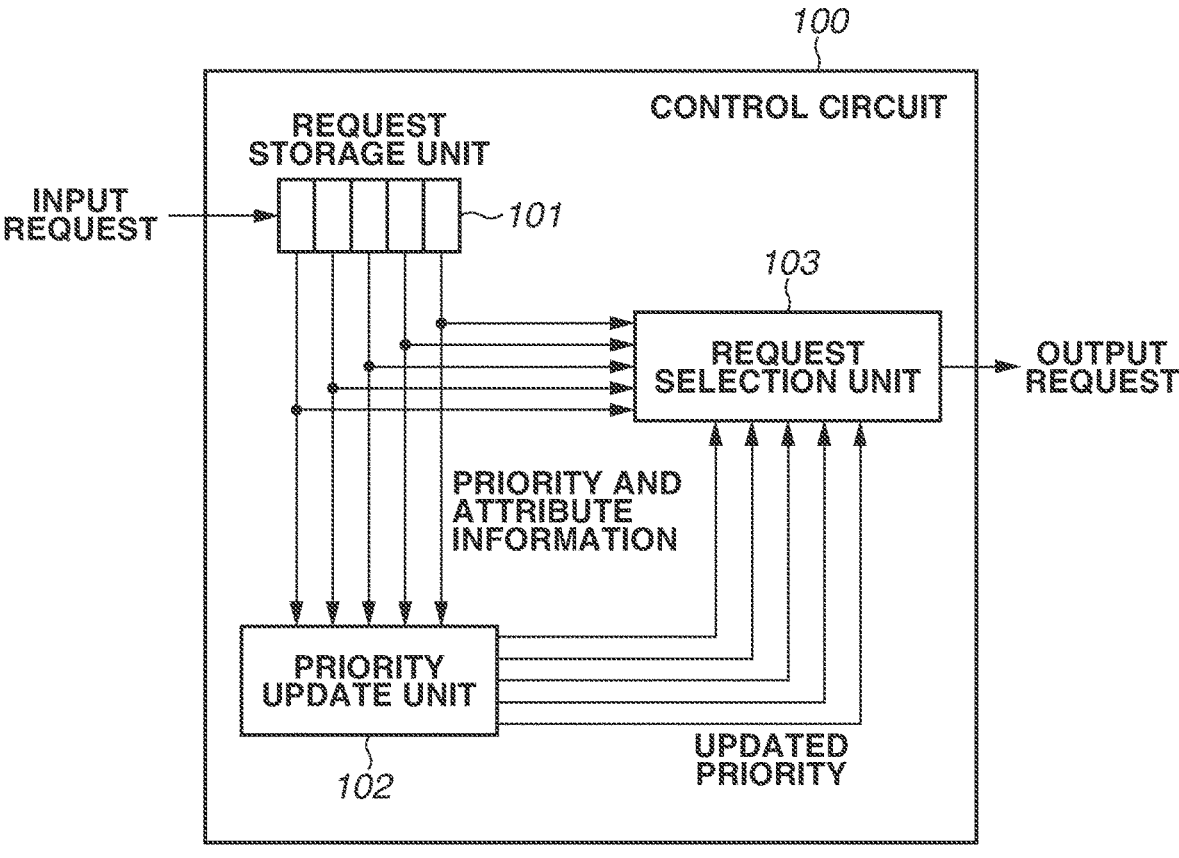
FIG. 1 illustrates a configuration example of a control circuit according to an example embodiment.

FIG. 1 is a block diagram illustrating a configuration example of a control circuit 100 according to an example embodiment of the present disclosure. The control circuit 100 according to the present example embodiment receives a plurality of access requests issued by an initiator (an access request source) not illustrated, selects an access request from the plurality of access requests, and transmits the selected access request to a target (an access request destination) not illustrated. The control circuit 100 includes a request storage unit 101, a priority update unit 102, and a request selection unit 103.

The request storage unit 101 is a buffer for storing an access request issued by the initiator to the target. The request storage unit 101 includes a plurality of entries and can store a plurality of access requests. The number of entries included in the request storage unit 101 can be arbitrary as long as it is plural.

The request storage unit 101 receives an access request including a priority and attribute information and stores the access request in the entry in an order of reception. In a case where the request selection unit 103 selects an access request from among the stored access requests and transmits it, the request storage unit 101 deletes the selected access request. The access request stored in the entry having an entry number greater than that of the entry that is emptied by deleting the selected access request is moved to the entry having one less entry number so as to fill the entry from which the access request has been deleted.

The attribute information includes, for example, identification information (ID information) for identifying a request source of the access request and information indicating whether the access request is a read access or a write access.

The attribute information described here is an example and is not limited to the example. The ID information can be different for each initiator and can be further different for each process to be executed and each thread.

The priority update unit 102 receives an input of the priority and the attribute information of the access request stored in the request storage unit 101, updates the priority of the access request based on the input priority and attribute information, and generates an updated priority. The generated updated priority is transmitted to the request selection unit 103.

The request selection unit 103 selects the access request stored in the request storage unit 101 based on the updated priority generated by the priority update unit 102 and transmits the selected access request. The request selection unit 103 selects the access request in a descending order of the priority after update based on the generated updated priority. In a case where there is a plurality of access requests having the same updated priority, the request selection unit 103 selects the access request in an ascending order of the entry number in the request storage unit 101.

Figure 2:
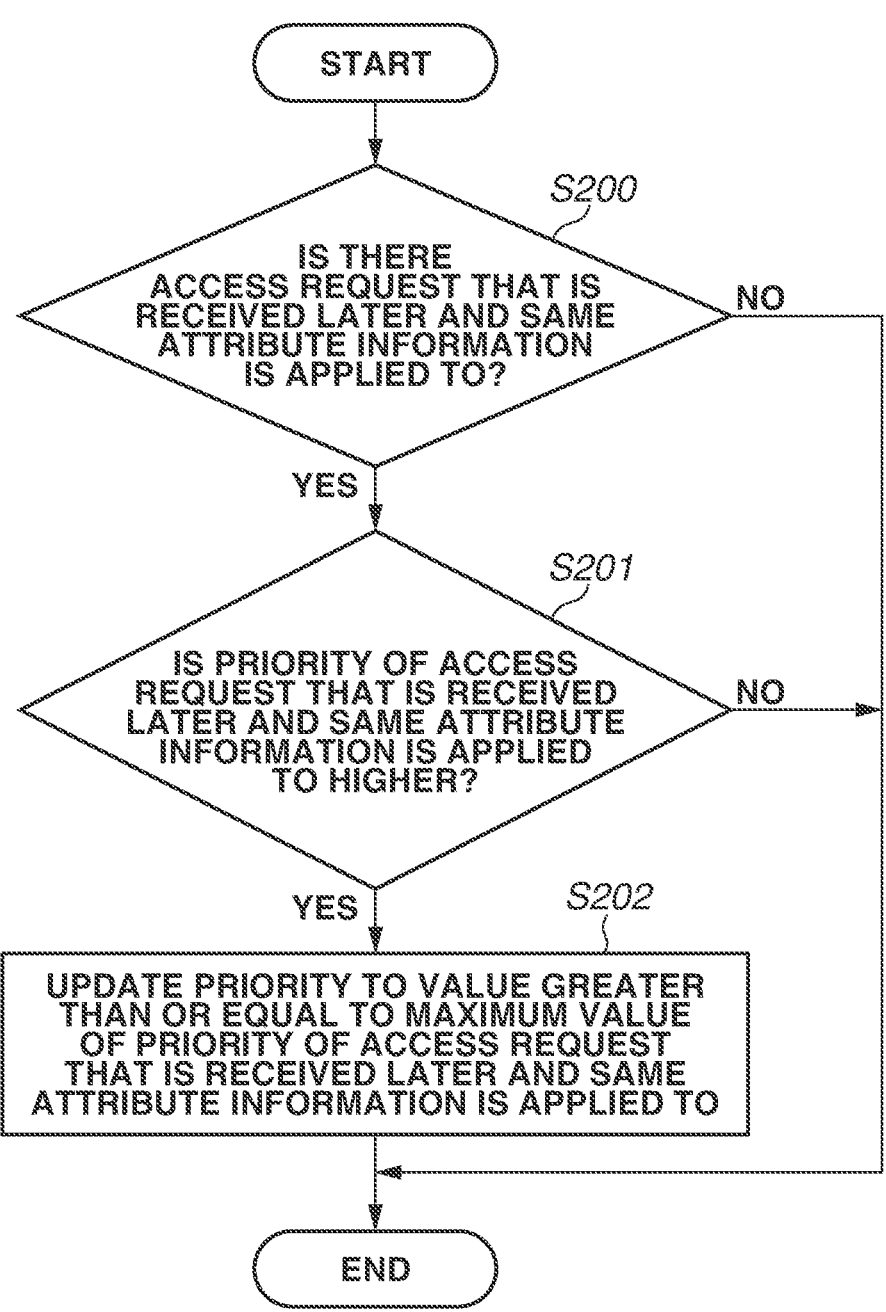
FIG. 2 is a flowchart illustrating an example of processing for generating an updated priority according to the present example embodiment.

FIG. 2 is a flowchart illustrating an example of processing for generating the updated priority by the priority update unit 102. The priority update unit 102 constantly monitors the access request stored in the request storage unit 101. The priority update unit 102 executes the processing in the flowchart illustrated in FIG. 2 to each entry of the request storage unit 101, in which the access request is stored, and updates the priority of the access request. The processing in the flowchart illustrated in FIG. 2 is constantly executed regardless of whether a state of the access request stored in the request storage unit 101 is changed or not.

In step S200, the priority update unit 102 determines, for each entry of the request storage unit 101, whether there is an access request that is received later than the entry and the same attribute information is applied to. In a case where the priority update unit 102 determines that there is the access request that the same attribute information is applied to (YES in step S200), the processing proceeds to step S201. On the other hand, in a case where the priority update unit 102 determines that there is no access request that the same attribute information is applied to (NO in step S200), the processing ends without updating the priority.

In step S201, the priority update unit 102 compares the priority of the access request in each entry with the priority of the access request that is received later than the entry and the same attribute information is applied to. The priority update unit 102 determines whether the priority of the access request, which is received later and the same attribute information is applied to, is higher than the priority of the access request that is received earlier. In a case where the priority update unit 102 determines that the priority of the access request that is received later than the entry and the same attribute information is applied to is higher than the priority of the access request in each entry (YES in step S201), the processing proceeds to step S202. On the other hand, in a case where the priority update unit 102 determines that the priority of the access request that is received later than the entry and the same attribute information is applied to is not higher than the priority of the access request in each entry (NO in step S201), the processing ends without updating the priority.

In step S202, the priority update unit 102 updates the priority of the access request in each entry to a value more than or equal to a maximum value of the priority of the access request that is received later and the same attribute information is applied to and ends the processing. In other words, the priority update unit 102 updates the priority of the access request in each entry to be higher than or equal to the priority of the access request that is received later and the same attribute information is applied to.

FIGS. 3A to 3C illustrate examples of operations by the control circuit 100 according to the present example embodiment. FIG. 3A illustrates an example of a plurality of access requests stored in the request storage unit 101. In FIG. 3A, entries including six entries from an entry number 1 to an entry number 6 in an order from the top respectively store five access requests in an order of access requests A, B, C, D, and E.

The attribute information included in each access request includes the ID information for identifying the request source of the access request and the information indicating whether the access request is a read access or a write access. Further, the priority is applied to each access request. The attribute information described in the present example embodiment is an example, and the present example embodiment is not limited to this example. Regarding a number of the priority in the present example embodiment, a greater value indicates a higher priority, but the present example embodiment is not limited to this example. The priority is not limited to a number and can be arbitrary as long as the priority (priority order) of the access request is indicated.

In the example in FIG. 3A, both the access request C and the access request E are read accesses that have an ID of 1 and include the same attribute information. There is a restriction that an order of execution cannot be changed for the access requests including the same attribute information, and in this case, it is necessary to execute the access request E after executing the access request C.

FIG. 3B illustrates an example in which the access requests in FIG. 3A are rearranged in an issuance order from the control circuit 100 without updating the priority using a conventional method. The access request D is rearranged at the top of the issuance order based on the priority. The access requests A, B, and C have the same priority and are arranged in the order stored in the entry of the request storage unit 101 (in the ascending order of the entry number). Meanwhile, the access request E has a highest priority among the stored access requests, but needs to be selected after the access request C that has the same attribute information and a lower priority is selected. Thus, the access request E becomes the last of the issuance order.

FIG. 3C illustrates an example in which the access requests are rearranged in the issuance order from the control circuit 100 based on the priority updated by the priority update unit 102 according to the present example embodiment. The priority of the access request C is updated, based on an update algorithm of the priority update unit 102, to the same priority as that of the access request E that is received later than the entry of the access request C and the same attribute information is applied to. Accordingly, the priority of the access requests C and E becomes higher than the priorities of the other access requests A, B, and D, and the access requests C and E are moved up in the issuance order. In the example illustrated in FIG. 3C, the priority of the access request C is updated to the same priority as that of the access request E. However, it goes without saying that even if the priority of the access request C is updated to be higher than the priority of the access request E, the issuance order will be the same as the example in FIG. 3C.

As described above, the control circuit 100 updates the priority of the access request that is received earlier based on the priority of the access request that is received later and the same attribute information is applied to. In a case where the priority of the access request that is received later and the same attribute information is applied to is higher than the priority of the access request that is received earlier, the priority of the access request that is received earlier is updated to a value more than or equal to the maximum value of the priority of the access request that the same attribute information is applied to. Accordingly, in a case where a high-priority access request that the same attribute information is applied to is received, the high-priority access request can be promptly selected and transmitted even if there is a low-priority access request that is received earlier.

Figure 4:
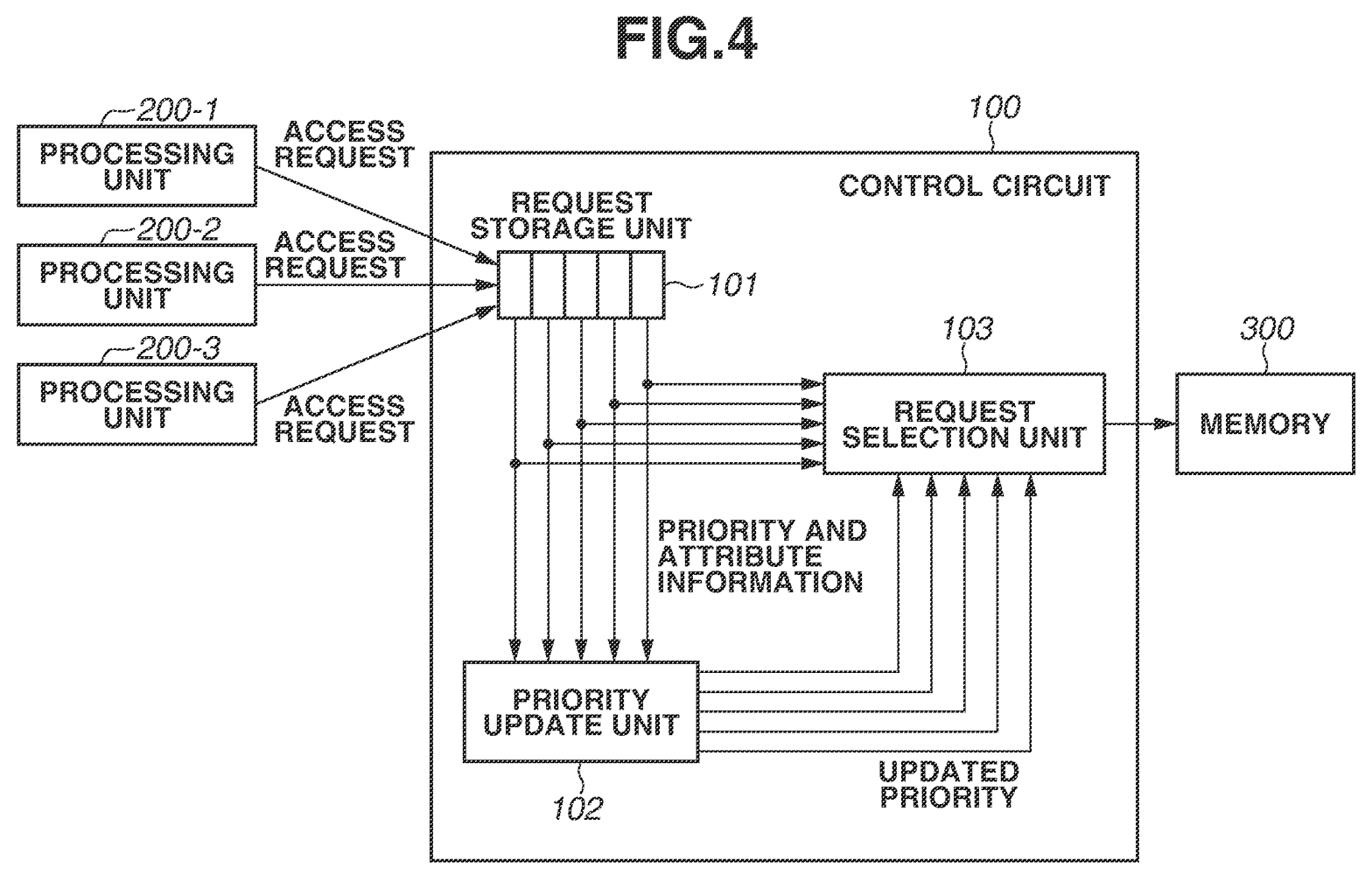

FIG. 4 illustrates a configuration example of an information processing system (a computer system) to which the control circuit 100 according to the present example embodiment is applied. FIG. 4 illustrates an example in which the control circuit 100 according to the present example embodiment is applied to a memory control circuit. In FIG. 4, components having the same functions as those illustrated in FIG. 1 are denoted by the same reference numerals, and descriptions thereof are omitted.

In FIG. 4, a processing unit 200 (200-1, 200-2, or 200-3) functions as an initiator that issues an access request. A memory 300 functions as a target that performs an operation corresponding to the access request issued from the processing unit 200. The processing unit 200 is, for example, an arithmetic processing apparatus (a processor) such as a central processing unit (CPU). The processing unit 200 issues a memory access request for accessing the memory 300 by applying a priority and attribute information thereto.

In the information processing system illustrated in FIG. 4, the memory access request issued from the processing unit 200 is received by the control circuit 100 and stored in the request storage unit 101. Based on the priority and the attribute information of the memory access request stored in the request storage unit 101, the priority update unit 102 updates the priority of the memory access request in a similar manner with the above-described example embodiment and generates the updated priority. Subsequently, the request selection unit 103 selects the access request stored in the request storage unit 101 based on the updated priority and transmits the selected access request to the memory 300. Accordingly, in a case where a high-priority memory access request that the same attribute information is applied to is received, the high-priority memory access request can be promptly selected and transmitted even if there is a low-priority memory access request received earlier.

FIG. 4 illustrates the example including three processing units 200 and one memory 300, but the configuration is an example, and the number of the processing units 200 and the memory 300 are arbitrary, respectively. The control circuit 100 according to the present example embodiment is not limited to the example illustrated in FIG. 4 and can be applied to a system in which a plurality of initiators such as processing units that issues an access request shares one or a plurality of targets that performs an operation corresponding to the access request. For example, the control circuit 100 can be applied to an interface circuit that selects and transmits an access request to a target by receiving the access request to an input-output (IO) unit or a communication unit as a shared target.

In a computer system, a dynamic random access memory (DRAM) is generally used as a shared memory. The DRAM is a device of which an access performance greatly changes depending on an access order. Thus, in a case where access requests are rearranged, the access order can be rearranged in consideration of a plurality of conditions in which rearrangement based on the priority of the access request and rearrangement for deriving the access performance of the DRAM are combined. In a case where the access order is rearranged by combining the plurality of conditions, in terms of the priority of the access request, the rearrangement can be performed based on the priority of the access request while considering the plurality of conditions by using the updated priority described above in the example embodiments.

Various embodiments of the present disclosure can also be realized by the following processing. Specifically, a program for realizing one or more functions of the above-described example embodiments is supplied to a system or an apparatus via a network or a storage medium, and one or more processors in a computer in the system or the apparatus read and execute the program. Further, the example embodiments of the present disclosure can also be realized by a circuit (for example, an application specific integrated circuit (ASIC)) that realizes one or more functions.

The example embodiments described above are merely examples for implementing the present disclosure, so that the examples should not be construed to restrictively limit the technical scope of the present disclosure. In other words, various embodiments of the present disclosure can be implemented in the various forms without departing from the technical idea and/or the main features thereof.

According to various example embodiments of the present disclosure, a high-priority access request that the same attribute information is applied to can be promptly selected even if there is a preceding low-priority access request.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-068304, filed Apr. 14, 2021, which is hereby incorporated by reference herein in its entirety.

What is claimed is:

1. A control circuit connected with a memory comprising:
   a storage unit configured to store a plurality of memory access requests, wherein each of the memory access requests has a memory access priority which indicates an order of transfer and attribute information including identification information for identifying a request source of each of the memory access requests and access information indicating either a read memory access or a write memory access;
   an update unit configured to update, when a new memory access request is received later, and the new memory access request is stored in a storage unit of the control circuit, the memory access priority of one access request included in the plurality of memory access requests based on the memory access priority and the attribute information of the new memory access request; and
   a selection unit connected to the storage unit and configured to transfer the plurality of memory access requests in the order which is based on the memory access priority updated by the update unit,
   wherein when the identification information of the new memory access request is identical to the identification information of the one access request and the access information of the new memory access request is identical to the access information of the one access request, the update unit updates the memory access priority of the one access request and change the order of the one access request while keeping the order of transfer between the new memory access request and the one access request, according to the updated memory access priority of the one access request and the memory access priority of the new memory access request.

2. The control circuit according to claim 1, wherein, if where the memory access priority of the new memory access request is higher than the memory access priority of one of the plurality of memory access requests, the update unit makes the memory access priority of the one of the plurality of memory access requests higher.

3. The control circuit according to claim 1, wherein the selection unit selects the memory access request that the same attribute information is applied to in an order of reception.

4. The control circuit according to claim 1, wherein the attribute information includes identification information for identifying a request source of the memory access request.

5. The control circuit according to claim 4, wherein the attribute information includes information indicating a read memory access or a write memory access.

6. An information processing system comprising:
a processing unit configured to issue memory access requests that a memory access priority and attribute information are applied to;
a control circuit that includes:
    a storage unit configured to store a plurality of memory access requests, wherein each of the memory access requests has the memory access priority which indicates an order of transfer and the attribute information including identification information for identifying a request source of each of the memory access requests and access information indicating either a read memory access or a write memory access;
    an update unit configured to update, when a new memory access request is received later, and the new memory access request is stored in the storage unit of the control circuit, the memory access priority of one access request included in the plurality of memory access requests based on the memory access priority and the attribute information of the new memory access request; and
    a selection unit connected to the storage unit and configured to transfer the plurality of memory access requests in the order which is based on the memory access priority updated by the update unit; and
a memory configured to perform an operation corresponding to the memory access requests transmitted from the control circuit,
wherein when the identification information of the new memory access request is identical to the identification information of the one access request and the access information of the new memory access request is identical to the access information of the one access request, the update unit updates the memory access priority of the one access request and change the order of the one access request while keeping the order of transfer between the new memory access request and the one access request, according to the updated memory access priority of the one access request and the memory access priority of the new memory access request.

7. A control method comprising:
storing, in a storage unit, a plurality of memory access requests, wherein each of the memory access requests has a memory access priority which indicates an order of transfer and attribute information including identification information for identifying a request source of each of the memory access requests and access information indicating either a read memory access or a write memory access;
updating, when a new memory access request is received later, and the new memory access request is stored in the storage unit of the control unit, the memory access priority of one access request included in the plurality of memory access requests based on the memory access priority and the attribute information of the new memory access request; and
transferring the plurality of memory access requests in the order which is based on the memory access updated priority,
wherein when the identification information of the new memory access request is identical to the identification information of the one access request and the access information of the new memory access request is identical to the access information of the one access request, the update unit updates the memory access priority of the one access request and change the order of the one access request while keeping the order of transfer between the new memory access request and the one access request, according to the updated memory access priority of the one access request and the memory access priority of the new memory access request.

8. The control method according to claim 7, wherein, if the memory access priority of the new memory access request is higher than the memory access priority of one of the plurality of memory access requests, the updating makes the memory access priority of the one of the plurality of memory access requests higher.

9. The control method according to claim 7, further comprising selecting the memory access request that the same attribute information is applied to in an order of reception.

10. The control method according to claim 7, wherein the attribute information includes identification information for identifying a request source of the memory access request.

11. The control method according to claim 10, wherein the attribute information includes information indicating a read memory access or a write memory access.

12. The information processing system according to claim 6, wherein, if the memory access priority of the new memory access request is higher than the memory access priority of one of the plurality of memory access requests, the update unit makes the memory access priority of the one of the plurality of memory access requests higher.

13. The information processing system according to claim 6, wherein the selection unit selects the memory access request that the same attribute information is applied to in an order of reception.

14. The information processing system according to claim 6, wherein the attribute information includes identification information for identifying a request source of the memory access request.

15. The information processing system according to claim 14, wherein the attribute information includes information indicating a read memory access or a write memory access.

* * * * *